United States Patent [19]

Robinson

[11] Patent Number: 4,953,193
[45] Date of Patent: Aug. 28, 1990

[54] FASTENING COMBINATION HAVING SPECIAL UTILITY IN AFFIXING AN X-RAY MARKING DEVICE TO A CASSETTE ADAPTED TO HOLD X-RAY FILM

[76] Inventor: Norman L. Robinson, 3006 Friendswood Dr., Arlington, Tex. 76013

[21] Appl. No.: 236,198

[22] Filed: Aug. 25, 1988

[51] Int. Cl.⁵ .............................................. G03B 42/02
[52] U.S. Cl. ..................................... 378/162; 378/165
[58] Field of Search ................................. 378/162–165

[56] References Cited

U.S. PATENT DOCUMENTS

| | | |
|---|---|---|
| 3,316,669 | 9/1964 | Nachbar . |
| 3,518,428 | 5/1968 | Ring ..................................... 378/165 |
| 3,591,804 | 7/1971 | Minasian ............................. 378/165 |
| 3,668,394 | 6/1972 | Panzer ................................. 378/165 |
| 3,982,132 | 9/1976 | Kay et al. . |
| 4,074,373 | 2/1978 | Garofalo ................................ 5/325 |
| 4,127,774 | 11/1978 | Gillen ................................. 378/162 |
| 4,194,122 | 3/1980 | Mitchell et al. ...................... 378/162 |
| 4,426,723 | 1/1984 | Rouse ................................. 378/165 |
| 4,529,635 | 7/1985 | Sheldon .............................. 378/165 |
| 4,640,039 | 2/1987 | O'Neill ................................ 43/21.2 |
| 4,698,836 | 10/1987 | Minasian ............................ 378/165 |
| 4,752,948 | 6/1988 | MacMahon ......................... 378/197 |

Primary Examiner—Carolyn E. Fields
Assistant Examiner—David P. Porta
Attorney, Agent, or Firm—Charles W. McHugh

[57] ABSTRACT

A fail-safe X-ray film marking system that includes a reusable fastening combination adapted for use in temporarily fastening a marking element to a container that is configured for holding X-ray film. The marking element is at least partially opaque to X-rays, and it is adapted to be positioned on the cassette in such a way that an image of an identifying character of the marking element will be imprinted on the X-ray film (inside the container) after it is exposed to radiation. The fastening combination is formed from X-ray permeable material that will not degrade the quality of an image produced on the subsequently exposed X-ray film; a suitable material for the combination is nylon.

The fastening combination preferably includes a relatively large sheet having a pile-like surface comprising a multitude of small, short loops of the kind that can be engaged by a multitude of resilient hooks of the Velcro type. The sheet also has an adhesive mounting surface that is adapted to be securely affixed to the top face of the container in a manner that clearly defines at least a portion of the periphery of a sheet of X-ray film concealed inside the container. Ideally, the size of the large sheet is sufficient to cover at least most of the top face of the container in such a way as to completely and positively define the entire periphery of the sheet of X-ray film. Affixed to the bottom of the marking element is a plurality of resilient hooks that are cooperable with the loops of the sheet for effecting a temporary union therewith. With this fastening combination, any one of a variety of marking elements may be positioned so that it will overlie any desired portion of the X-ray film. This fail-safe marking system ensures that when the marking element is placed within the boundaries of the large sheet, an image of its identifying character will be imprinted in its entirety on the subsequently exposed X-ray film.

12 Claims, 1 Drawing Sheet

FASTENING COMBINATION HAVING SPECIAL UTILITY IN AFFIXING AN X-RAY MARKING DEVICE TO A CASSETTE ADAPTED TO HOLD X-RAY FILM

BACKGROUND OF THE INVENTION

This invention relates generally to the marking of X-ray film during the exposure thereof; more specifically, it relates to a means for conveniently and reliably affixing an X-ray marking device to a cassette that is adapted to hold X-ray film, such that an image of the marking device will be reproduced on the film when it is exposed to radiation.

It is well known in the medical field to mark X-ray film so that the part of a patient's body (e.g., a hand, an arm, etc.) that is "X-rayed" may be clearly identified on the film. Generally, the marking of X-ray film is accomplished by first placing a marking device that is at least partially impermeable to X-rays on the outer face of a suitable cassette, in such a way that the marker overlies a sheet of X-ray film concealed inside the cassette. When the film is exposed to radiation, an image of the marker will be reproduced on the film. Typical identifying characters on the markers are the letters L (for left) and R (for right); another major feature of such markers is a bubble-type level indicator, so that a surgeon, nurse, etc., can later determine whether a particular X-ray was made while the patient was standing erect or lying on a table. Unfortunately, the current methods for affixing a marking device to an X-ray film cassette often prove to be inconvenient and unreliable.

Perhaps the most common method for affixing a marker to a cassette is to use a strip of masking tape or surgical tape to secure the marker to the outer face of the cassette. A frequent problem with this method is that the tape generally loses its adhesive qualities after only a few uses—and the tape can very quickly become ineffective if it picks up dust, is exposed to moisture or liquids, etc. Also, the strip of tape is usually affixed over the marker in such a way that an X-ray technician cannot visually confirm the identifying character of the marker, because the character is often completely concealed underneath the opaque tape. This tends to cause the erroneous marking of X-ray film when a technician switches from, say, a patient's right arm to the left arm—but forgets to also switch markers. As the loaded cassette is inserted into the drawer of an X-ray table, the imminent error in identifying the exposed film is not likely to be caught because the marker is hidden from view.

Another problem experienced by X-ray technicians is that marking devices often are not adapted to be positively and securely affixed to the cassette; some marking devices are susceptible to being dislodged from the cassette while it is being loaded in the drawer of an X-ray table. This is especially a problem when the drawer opening is just barely high enough to allow the cassette to pass through the opening. That is, when the cassette drawer is being closed, a thick-profile marker on top of the cassette face might accidentally contact the upper edge of the drawer opening and be repositioned on—or be completely dragged off of—the cassette face. One other difficulty that X-ray technicians might encounter while attempting to suitably mark X-ray film for the subsequent enlightenment of a doctor is that of precisely locating the perimeter of a sheet of X-ray film concealed inside the cassette. Knowing exactly where the film is located within a cassette is essential to ensure that the marker is positioned within the film boundaries—and to ensure that the marker will be reproduced in its entirety on the subsequently exposed X-ray film. Hence, there has existed a need for a fastening combination which may be used to conveniently and reliably affix a marking device to the outer face of an X-ray cassette—so as to guarantee that the marker's identifying character will be properly reproduced on the sheet of X-ray film when it is exposed.

In the health care industry, it is common to use (Velcro-type fasteners) for a variety of fastening tasks. But insofar as is known, no one has ever used such fasteners for affixing an X-ray marking device to essentially any part of an X-ray cassette face—and yet do so in such a way as to ensure that the marking device will be reliably positioned within the boundaries of a sheet of X-ray film concealed inside the cassette.

Of course, there have been some prior art devices which have at least partially addressed some of the problems specifically related to affixing a marker to an X-ray cassette. Examples of these devices are shown in the following U.S. Pat.: Nos. 4,127,774 to Gillen entitled "X-Ray Marker"; and No. 4,426,723 to Rouse entitled "X-Ray Marker Device." These devices disclose suction cups for affixing a marker to the X-ray cassette. However, in order for the suction cups to have any chance of working effectively, the outer face of the cassette generally must be very smooth and flat. Thus, these devices probably would not be very useful with cassettes having a textured outer surface. And to reliably attach this suction-cup type of fastener to a flat cassette face, the cassette face must be regularly wiped clean so as to remove anything that could interfere with achieving a good seal between the suction cup and the cassette face. Also, marking devices that use suction cups for affixation are inherently so tall that they generally will not clear the top edge of the thin drawer openings in modern X-ray tables.

Other prior art devices employ magnets to affix a marker to the outer face of an X-ray cassette. Exemplary of such devices are those shown in the following U.S. Pat.: Nos. 4,698,836 to Minasian entitled "Means and Techniques Useful in Marking X-Ray Film"; and No. 3,518,428 to J. Ring entitled "Magnetically Attractive Identifying Plates for Attachment to X-Ray Cassettes." However, the magnetic force holding the marker to the cassette face probably would not be sufficient to resist a force acting on the marker in a transverse direction with respect to the cassette face. In other words, if the cassette should be inadvertently bumped while a technician is loading it into an X-ray drawer, the marker might accidentally be moved and reoriented on the cassette face. Another limitation of this type of fastening configuration is that it can only be used to fasten a marker to a steel or similar magnetically susceptible material on the cassette face. Thus, a magnetic marker could not be affixed to a cassette face formed from plastic, aluminum or the like.

There is one other device shown in U.S. Pat. No. 4,194,122 to Mitchell, et al. entitled "Apparatus for the Marking of X-Ray Film" which expressly acknowledges the need to securely fasten a marker to a cassette face. But this type of fastening configuration utilizes elaborate, multi-layered adhesive pads and tabs; and like a strip of masking tape, the adhesive materials have a limited useful life. In fact, Mitchell states (at column 2, lines 46 through 51) "when the adhesive coating on the lower face of the pad becomes dirty or otherwise loses its adhesive qualities with repeated use, the pad is removed. . . . A new pad is then applied to the support sheet." Moreover, the Mitchell fastening combination probably would not be very resistant to moisture or any liquids that might accidentally be splashed on the face of the cassette.

While the above-described devices have been configured for marking X-ray film, it seems that the designers of these prior art devices disregarded the importance of conveniently and reliably marking a cassette so as to positively ensure that the identifying character of the marker will appear on the subsequently exposed X-ray film. Accordingly, there has remained a need for a dependable fastening combination that is configured so as to guarantee that a marking device will remain properly positioned on the outer face of a cassette, in such a way that an image of the marker will be imprinted on the X-ray film when it is exposed. It is an object of this invention to provide such a dependable and convenient fastening combination for securely affixing a marking device to an X-ray cassette.

Another object is to provide a fastening combination that is configured to resist transverse movement of a marker across the cassette face, so as to prevent the marker from being easily dislodged and dragged beyond the periphery of a sheet of film within the cassette.

A further object is to provide a fastening combination that is configured so that a marker may clearly and positively be positioned so as to overlie the sheet of X-ray film.

Still another object is to provide a fastening combination that includes a relatively large sheet of pile-like material which is affixed to the outer face of the cassette in such a way as to define at least a portion of the periphery of a sheet of X-ray film concealed inside the cassette.

One other object is to provide a fastening combination that is reusable and has an essentially indefinite functional life.

These and other objects will no doubt be apparent from a reading of the specification and claims, and from a study of the accompanying drawing illustrating certain facets of the invention.

BRIEF DESCRIPTION OF THE INVENTION

In brief, the invention relates to a fail-safe X-ray film marking system that includes a reusable fastening combination adapted for use in temporarily fastening a marking element to a container that is configured for holding X-ray film. The marking element is at least partially opaque to X-rays, and it is adapted to be positioned on the cassette in such a way that an image of an identifying character of the marking element will be imprinted on the X-ray film (inside the container) after it is exposed to radiation. The fastening combination is formed from X-ray permeable materials that will not degrade the quality of an image produced on the subsequently exposed X-ray film.

In the preferred embodiment of the invention, the fastening combination includes a relatively large sheet having a pile-like surface comprising a multitude of small, short loops of the kind that can be engaged by a multitude of resilient hooks of the Velcro type. The sheet also has an adhesive mounting surface that is adapted to be securely affixed to the top face of the container in a manner that clearly defines at least a portion of the periphery of a sheet of X-ray film concealed inside the container. Ideally, the size of this large sheet is sufficient to cover at least most, and preferably all, of the top face of the container in such a way as to completely and positively define the entire periphery of the sheet of X-ray film. With this fastening combination, an X-ray technician may selectively position any one of a variety of marking elements or markers so that it will overlie any desired portion of the X-ray film. In this way, an image of the marker may be reproduced anywhere on the film after it is exposed.

The multitude of engageable loops that form the pile-like surface of the sheet are configured to extend away from the container. Affixed to the bottom of the marker is a multitude of resilient hooks that are cooperable with the loops of the sheet for effecting a temporary union therewith. With this configuration, affixing a marker at any location on the large sheet will guarantee that the marker is securely positioned within the border of the sheet of X-ray film inside the container. As long as the marker is placed within the boundaries of the sheet, an image of its identifying character will be imprinted in its entirety on the subsequently exposed X-ray film.

DETAILED DESCRIPTION OF THE INVENTION

Figure 1:
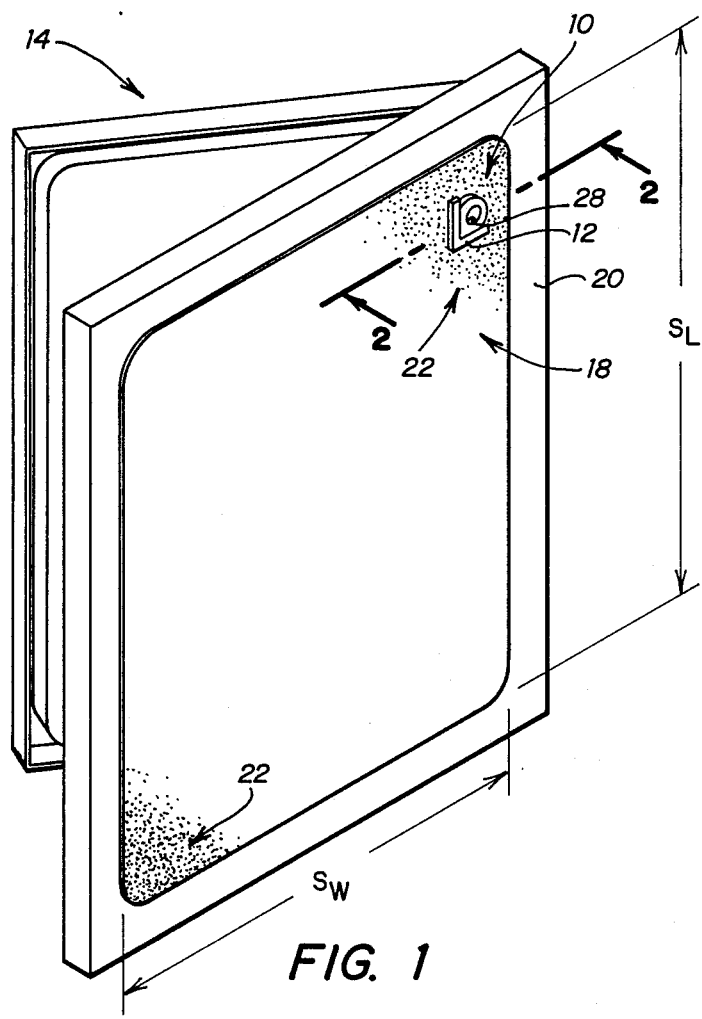
FIG. 1 is a perspective view of an open X-ray cassette adapted for holding a sheet of X-ray film therein, with most of the top outer face of said cassette being covered with a sheet of pile-like material, and including an X-ray opaque marker affixed to the large sheet near one corner thereof.
Figure 2:
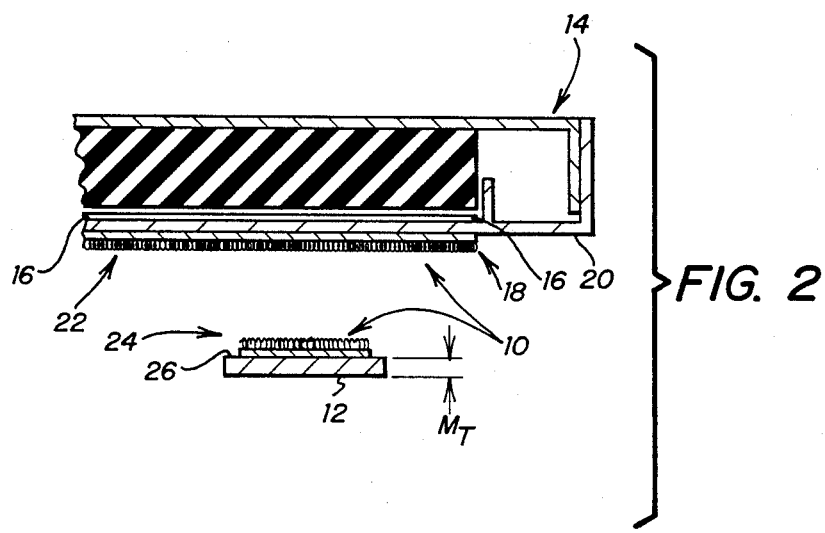
FIG. 2 is a fragmentary cross-sectional view of the X-ray cassette in a closed configuration (taken in a plane suggested by the lines 2—2 in FIG. 1), and showing the marker detached from the sheet, and also showing a plurality of hooks mounted to the underside of the marker.

Referring to FIGS. 1 and 2, a reliable and convenient fastening combination 10 is shown in accordance with this invention, with the combination being particularly well-adapted for use in temporarily affixing a small marking element 12 to an X-ray cassette 14 that is configured for holding X-ray film 16. The fastening combination 10 is formed from X-ray permeable materials, while the marking element 12 is constructed of a material which at least partially blocks the passage of radiation. Thus, an image of the marking element may be imprinted on a sheet of X-ray film 16 (that is held within the cassette) after the film is exposed to radiation.

The fastening combination 10 includes a relatively large sheet 18 having a mounting surface that is adapted to be securely mounted to the top face 20 of the X-ray cassette 14 (said top face being the face that is nearest the source of radiation). The large, thin sheet 18 is preferably at least somewhat flexible so as to be readily conformable to the contour of the top face 20; the sheet may be permanently mounted to the top face with an adhesive or the like. The external boundaries of the sheet 18 are uniquely dimensioned and oriented so as to define what will be referred to herein as a functional area on the cassette top face 20. That is, the sheet 18 is mounted so that at least a major portion of the sheet periphery will be juxtaposed with at least a portion of the periphery of the sheet of X-ray film 16 that is concealed within the cassette 14. In its preferred form, the entire periphery of the sheet 18 exactly matches the periphery of the X-ray film. The sheet 18 also has a pile-like outer surface 22 which preferably comprises a multitude of engageable loops that extend away from the cassette top face 20.

The fastening combination 10 further includes a means for detachably affixing a selected marking element or marker 12 to any chosen part of the pile-like surface 22, such that the marker may be located within the functional area defined by the boundaries of the sheet 18. The means for detachably affixing the marker 12 preferably includes a plurality of short resilient hooks 24 of plastic or the like that may be effectively considered to be permanently affixed (with an adhesive or the like) to the underside 26 of the marker. Ideally the plurality of hooks 24 and the sheet of loops 22 are fabricated from a Velcro-type materal. The resilient hooks 24 are designed to cooperate with the engageable loops of the sheet 18 to effect a temporary union therewith. And as shown in FIG. 2, the hooks and loops are sized so that they may be pushed together to affix the marker 12 to the sheet until such time as they are to be deliberately separated. Moreover, with this particular configuration, only the resilient hook portion needs to be moved in order to reposition a marker 12 over a desired portion of the X-ray film 16 (because there is already an excess of loop material in comparison with the hook material). The resilient hooks 24 and engageable loops 22 are also cooperable to resist movement of the marker 12 in both parallel and generally perpendicular directions with respect to the top face 20 of the cassette 14; therefore, the marker 12 will not be easily dislodged nor shifted from its initially established position while the cassette is being handled or loaded in the drawer of an X-ray table or the like. With this novel fastening configuration, placement of the marker 12 at any desired location on the sheet 18 guarantees that the marker will overlie the sheet of X-ray film 16 that is contained within the cassette 14; thus, a person such as an X-ray technician will be assured that an image of the marker will be imprinted in its entirety on the subsequently exposed X-ray film.

Figure 3:
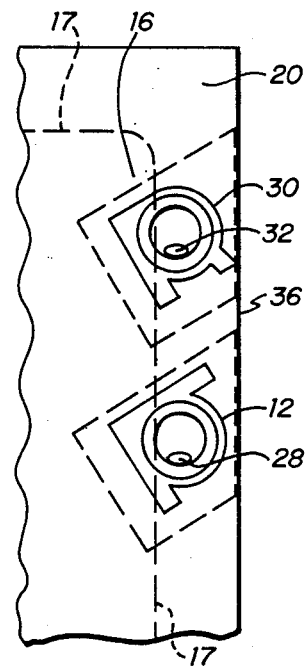
FIG. 3 is a fragmentary top view of a marking system of the prior art, showing how it is possible for masking tape or the like to be used in attaching markers to the face of an X-ray cassette in such a way that the resultant images of the markers on the exposed film are so fragmentary and incomplete as to be meaningless.
Figure 4:
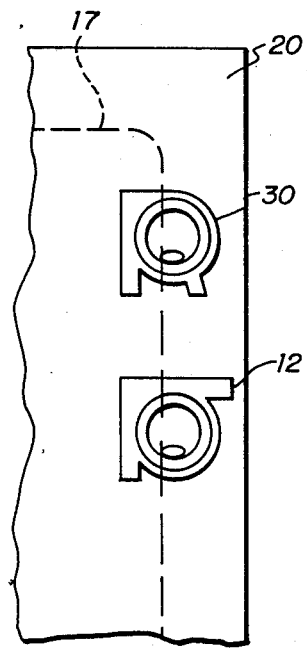
FIG. 4 is a fragmentary top view of a marker system of the prior art in which magnetic markers are positionable on the face of an X-ray cassette having small steel tabs at its edges, in such a way that the images of the markers on the exposed X-ray film will be so fragmentary and incomplete as to be meaningless.

Keeping the unique function of the large sheet 18 in mind, it should be recognized that the fail-safe X-ray film marking system disclosed herein is adapted to eliminate the ambiguities that can result when using conventional methods to attach an X-ray marker 12 to a cassette. For example, as shown in FIGS. 3 and 4, the periphery 17 of a sheet of X-ray film 16 inside a conventional cassette has been identified, but it must be remembered that this film is hidden from view (inside the cassette); and the X-ray technician does not have the benefit of actually seeing the situation that is being illustrated. Therefore, X-ray markers 30, 12 could be accidentally placed—or inadvertently dislodged and repositioned—on the cassette face 20 in such a way that only a partial image of the markers would appear on the subsequently exposed X-ray film 16. And when the markers have similar features (as they do), the partial images that will show up on the film might well be indistinguishable from each other. FIGS. 3 and 4 illustrate two typical opaque markers 12, 30, with both markers being partially positioned outside of the film periphery 17 and near one edge 36 of the cassette face 20. One marker 30 has an R (for right) and the other marker 12 has an L (for left) as identifying characters; each of the markers 12, 30 also has an associated element 28, 32 in the form of a bubble-type level indicator that is at least partially opaque to X-rays. The indicator 28, 32 is responsive to gravity, and it permits a person to subsequently ascertain whether the cassette was oriented vertically or horizontally when the film was exposed to radiation. Unfortunately, if these markers 12, 30 were accidentally positioned as illustrated in the figures and the film 16 were exposed, a person could not later conclusively identify a marker's identifying character or even determine how the cassette 14 was oriented. In view of the ambiguities that can result when attempting to mark X-ray film in accordance with the prior art, it will be appreciated that the fastening combination 10 is particularly advantageous in that any marker that is placed on the large sheet 18 of looped material will positively be positioned within the film's periphery 17.

Another advantage of the fastening combination 10 is that the loops 22 and hooks 24 are engaged with each other in such a way that a very small gap is created between the marker's underside 26 and the cassette top face 20. This small gap provides sufficient access to the marker's bottom 26 so as to facilitate grasping and repositioning of the marker 12 on the sheet 18. In addition, it will be appreciated that a conventional thin-profile marker 12 having a thickness of about 0.1 inch will not be dislodged by the top edge of the opening in a typical X-ray drawer in a bucky or table when the cassette is placed in the drawer and the drawer is closed. The thickness of the marker 12 is identified by the designation $M_t$ in FIG. 2. The area of the thin sheet 18 is preferably sufficient to cover at least most of the cassette top face 20, such that the sheet 18 defines at least most of the periphery of the sheet 16 of X-ray film in the cassette 14; thus, an image of the marker may be reproduced at any location on the film 16 that is covered by the sheet. While the external sheet 18 may be sized and configured so that it is slightly smaller than a sheet of X-ray film 16, it should not encompass an area that is greater than the area of X-ray film; such X-ray film sheets vary in size from 5 by 7 inches to 14 by 17 inches. The most commonly used cassettes are probably 8 by 10 inches, 10 by 12 inches, 11 by 14 inches, 7 by 17 inches, and 14 by 17 inches. The area encompassed by the sheet 18 is preferably at least 75 square inches, such that the functional area on the cassette face 20 is also at least 75 square inches. The length of the sheet 18 is represented in FIG. 1 by the notation $S_L$, and the width of the sheet is represented by the notation $S_W$. A preferred thickness for the sheet 18 is about 0.1 inch.

With the size of the sheet in mind, it should be readily apparent that the plurality of hooks 24 cover a relatively small area in comparison to the area of the sheet 18; in fact, their respective areas will likely differ by a factor of about 1 to 100. Hence, a multitude of markers 12, including a variety of different markers, may be simultaneously affixed to the single sheet 18 at various locations within the periphery of the sheet. Besides the illustrated and conventional "left" and "right" markers, it would be possible to add information such as a patient's name, the date and time that the X-ray was taken, the type of X-ray, the technician's name, and similar information that may vary from day to day. All of such markers will have radiopaque characteristics, of course, in accordance with well-known standards in the industry.

The marker 12 shown in FIGS. 1 and 2 is especially well-adapted for use with the fastening combination 10, because the marker has such a very thin profile. The preferred overall thickness for the marker and the hook material 24 will be no more than about 0.18 inch, when a user is concerned about safety and preventing radiation from venting through any gaps, slots or otherwise unprotected spaces in an X-ray table, etc. To use the fastening combination 10 with such a marker 12, the first step is to affix the large sheet 18 of pile-like material to a major portion of the cassette top face 20—being careful to position the sheet so that radiation will pass through the sheet in order to reach a matching portion of the X-ray film 16 contained within the cassette. Then, the hook portion of the fastener is glued or otherwise attached to the bottom of the marker 12, so that the hooks may be selectively attached to a chosen spot on the sheet 18.

It is probably worth mentioning that extensive research and testing has revealed that Velcro-brand loop material (which is 100% nylon) is completely permeable to X-rays, and it will not not affect the quality of an image produced on the X-ray film 16 after it is exposed. Other brands of loop material have also been found to be of a good grade of nylon and hence will not scatter, absorb or otherwise interfere with the making of high-quality films for medical or other use. But persons skilled in the art will no doubt appreciate the wisdom of checking out some new looped material before applying it to thousands of cassettes, just to make sure that it produces the same dependable results that are described herein using pure nylon. Appropriate resolution and densitometry tests can, of course, be performed at any time to provide reassurance to the user that a proposed substitute for virgin nylon looped material has the resolution and absorptive characteristics that are preferred for use as a sheet 18. Another major advantage of the fastening combination 10 is that the sheet 18 is replaceable if it should ever become torn or contaminated so that ordinary washing will not render it satisfactorily clean.

While only certain preferred embodiments of the invention are disclosed herein, it should be apparent to those skilled in the art that modifications can be made without departing from the spirit of the invention. For example, four small sheets could be substituted for one large and continuous sheet 18, with the four small sheets being carefully mounted to the cassette top face in the four corners of the cassette; this would effectively divide the functional area of the sheet into separate quadrants while still defining the general outline (if not the full periphery) of the concealed film. But it is believed that even four such small "quadrants" should cover at least 50% of the film's area, in order to realize the major benefits of the invention. And if major collimation of the X-ray beams is anticipated in the lab, the user may choose to position those four "quadrants" slightly inside the general outline of the X-ray film, so that the reduced area where photons will be striking the patient's body will not cause any cropping of a marker's image on the exposed film. Regardless of the physical shape of the engageable sheet that is used, it should exhibit the radiolucent characteristics of sheet 18 that have been described herein—in order to realize the full benefit of the invention. That is, it should allow the transmission of virtually all photons in the primary or useful beam generated by the X-ray tube; in this sense, photons and X-rays are synonymous, and the two words are often used interchangably. Also, the engageable sheets as defined herein could be formed from the hooked material, and the bottom of the marker could have looped material affixed thereto. But reversing the spatial arrangement of hooks and loops in such a manner would likely create a financial disadvantage to the manufacturer, because the looped material is usually more economical than the hook material. Also, the hooks are more prone to accidentally snag on clothing, covers, sheets or even upholstery; so putting the more passive loops on the cassette (which is handled much more than a marker) will make the cassette essentially as easy to handle as an ordinary X-ray cassette of the prior art. Of course, any structure shown herein is intended to be exemplary and is not meant to be limiting, except as described in the claims appended hereto.

What is claimed is:

1. A combination adapted for use in temporarily affixing a small marking element to an X-ray cassette, such a cassette being of the type having a body with an internal cavity for receiving X-ray film and holding the same in a known position in order that the film can be subjected to radiation in a controlled manner, and such a cassette having external boundaries as well as top and bottom faces, said marking element being at least partially opaque to X-rays, and said marking element being adapted to be positioned such that an image of the marking element will be reproduced on X-ray film contained in the cassette when the film is exposed to radiation, comprising:

a. a sheet having top and bottom surfaces, and the bottom surface of the sheet being adhesively affixed to the top face of an X-ray cassette, said top face being the face which is nearest a source of radiation during a radiological procedure, and the external boundaries of said sheet defining a functional area on the top face of said cassette when the sheet is affixed thereto, and said sheet having an area which is at least one-half the size of X-ray film which is to be placed within the cassette cavity, and said sheet having a plurality of elements of the type employed with hook and loop fasteners on its top surface, and the sheet being formed from X-ray permeable material that will not affect the quality of an image produced on the X-ray film when the film is exposed to a source of radiation; and b. means for detachably affixing a selected marking element to any chosen part of the top surface of said sheet, said means including elements which are complementary to the elements that are on the sheet's top surface, such that said marking element may be located within the functional area defined by the boundaries of the sheet, and the size of the marking element being significantly smaller than the size of the sheet, whereby the image of a marking element will be imprinted on the X-ray film when the film is exposed to radiation.

2. The combination as claimed in claim 1 wherein said top surface of the sheet comprises a multitude of loops, and wherein the marking element has an outer side that is visible when the marking element has been affixed to the sheet, and the marking element has an underside that is substantially hidden from view when the marking element has been affixed to the sheet, and wherein said means for detachably affixing the marking element includes a plurality of resilient hooks affixed to the underside of said marking element, and the loops and hooks being sized so that they may be pushed together and engaged so as to affix said marking element to said sheet until such time as they are to be deliberately separated.

3. The combinations as claimed in claim 1 wherein the area encompassed by said sheet is at least 75 square inches, such that the functional area on the top face of the cassette is at least 75 square inches, and the area of a marking element being substantially less than 75 square inches, whereby a plurality of marking elements may be simultaneously affixed to a single sheet at various locations within the periphery of said sheet.

4. A fastening combination adapted for use in temporarily fastening a marker to a container configured for holding X-ray film, such a container having a top and a bottom, and said marker having a top and a bottom and being constructed of material which at least partially blocks the passage of radiation, in order that an image of the marker will be imprinted on any X-ray film that is held within said container when radiation is passed through the top of the container, comprising:
   a. a thin sheet of X-ray permeable material having a top and a bottom, and the bottom of the sheet being affixed with adhesive to the top of the container in such a way that at least a major portion of the sheet's periphery will be juxtaposed with at least a portion of the periphery of a sheet of X-ray film that is concealed within the container, and the area encompassed by the sheet being substantially larger than the area encompassed by the marker, and the top of said sheet having a multitude of engageable loops that extend upwardly and away from said container when the sheet is mounted thereon; and
   b. a plurality of resilient hooks permanently affixed to the bottom of said marker, and said hooks being cooperable with the upwardly extending loops of said sheet for effecting a temporary union therewith, whereby placing said marker at any location on said sheet guarantees that said marker will overlie at least a portion of the sheet of X-ray film that is concealed within the container, with the result that an image of the marker will be imprinted in its entirety on the subsequently exposed X-ray film.

5. The combination as claimed in claim 4 wherein the size of said sheet is sufficient to cover at least most of the top of the container so as to define at least most of the periphery of the sheet of X-ray film in the container, whereby an image of the marker may be reproduced at any desired location over most of the sheet of X-ray film.

6. The combination as claimed in claim 4 wherein the resilient hooks and engageable loops are cooperable to resist movement of said marker in both parallel and generally perpendicular directions with respect to the top of said container, such that the marker will not be easily dislodged or shifted from an initially established position on top of the container.

7. The combination as claimed in claim 4 wherein both the sheet and the resilient hooks are formed from X-ray permeable material that will not affect the quality of an image produced on the X-ray film after it is exposed.

8. The combination as claimed in claim 4 wherein said plurality of hooks cover a very small area in comparison to the relatively large area of said sheet, and the ratio of sheet area to hook area is on the order of 100 to 1.

9. The method of marking X-ray film so as to indicate the orientation of a film cassette at the time that the cassette is exposed to radiation, said cassette having top and bottom faces and a central cavity for holding X-ray film internally in a predetermined position, comprising:
   a. providing a sheet of pile-like material across at least the major portion of the top of the cassette, such that radiation will pass through the sheet in order to reach X-ray film contained within the cavity in the cassette, and the sheet being sufficiently permeable to X-rays as to cause no scattering or filtering of impinging X-rays; and
   b. selectively attaching a marker to a chosen spot on the sheet after the sheet has been attached to the cassette, the size of the marker being small relative to the size of the sheet, and said marker being at least partially opaque to X-rays, and the marker having a movable element therein which is responsive to gravity, whereby an image of the marker will be manifested on the X-ray film after the cassette has been subjected to radiation that is directed through the sheet and the top of the cassette, and whereby the movable element that is responsive to gravity will permit a person to subsequently examine the exposed film and ascertain the orientation of the cassette at the time that it is subjected to radiation.

10. The method as claimed in claim 9 wherein the sheet of pile-like material is approximately as large as the size of the sheet of X-ray film which is to be placed within the cassette, and including the further step of covering nearly all of the top face of the cassette with said sheet of pile-like material.

11. The method as claimed in claim 9 and including the further step of placing at least two peripheral edges of said pile-like sheet in juxtaposition with at least two edges of the X-ray film within the cassette, whereby placing said marker on the sheet will increase the probability of positioning the marker so that its image will appear on the exposed film.

12. The method as claimed in claim 9 and including the further step of placing the periphery of said sheet of pile-like material so that it is coincident with the periphery of the sheet of X-ray film in the cassette, whereby selectively placing said marker within the periphery of said sheet will ensure that said marker overlies the X-ray film, such that an image of the marker will be reproduced in its entirety on the subsequently exposed X-ray film.

* * * * *